United States Patent [19]

Lemelson

[11] E Re. 28,600

[45] Reissued Nov. 4, 1975

[54] EXTRUSION DIE APPARATUS

[76] Inventor: Jerome H. Lemelson, 85 Rector St., Metuchen, N.J. 08840

[22] Filed: June 25, 1973

[21] Appl. No.: 373,510

Related U.S. Patent Documents

Reissue of:

[64] Patent No.: 3,587,281
Issued: June 28, 1971
Appl. No.: 734,685
Filed: June 5, 1968

U.S. Applications:

[63] Continuation-in-part of Ser. No. 142,405, Oct. 2, 1961, Pat. No. 3,422,648, which is a continuation-in-part of Ser. No. 691,622, Oct. 2, 1957, Pat. No. 3,002,615, and reissued as U.S. Pat. No. Re. 25,570, Oct. 2, 1962, Ser. No. 228,223.

[52] U.S. Cl. ..... 72/265; 72/260; 425/465

[51] Int. Cl.[2] ..... B21C 23/20

[58] Field of Search ..... 72/258, 260, 265; 264/167; 425/465, 466, 382

[56] References Cited

UNITED STATES PATENTS

| | | | |
|---|---|---|---|
| 2,819,794 | 1/1958 | Krause | 72/260 |
| 3,002,615 | 10/1961 | Lemelson | 72/260 |
| 3,152,202 | 10/1964 | Murphy | 18/14 V |
| 3,163,691 | 12/1964 | Anderson et al. | 264/167 |
| 3,209,404 | 10/1965 | Hagen | 425/466 |
| 3,218,672 | 11/1965 | Langecker | 18/14 V |
| 3,252,181 | 5/1966 | Hureau | 425/382 |
| 3,281,896 | 11/1966 | Meyer | 18/14 V |
| 3,281,896 | 11/1966 | Meyer et al. | 425/466 |
| 3,369,273 | 2/1968 | Moran | 18/14 V |
| 3,381,337 | 5/1968 | Hureau | 425/382 |
| 3,384,692 | 5/1968 | Galt et al. | 264/167 |
| 3,422,648 | 1/1969 | Lemelson | 72/260 |
| 3,530,536 | 9/1970 | Thorman et al. | 425/163 |
| 3,587,281 | 6/1971 | Lemelson | 72/265 |
| 3,700,521 | 10/1972 | Gaffney | 264/167 |

*Primary Examiner*—C. W. Lanham
*Assistant Examiner*—M. J. Keenan
*Attorney, Agent, or Firm*—Eyre, Mann & Lucas

[57] ABSTRACT

An extrusion die including a mandrel and means for relatively moving the mandrel and the die to produce extrusions of different or variable cross sections. In one form, the mandrel is longitudinally movable in the die and has different portions of different shape which, when predeterminately positioned in the die opening, produce extrusions of different shapes. In another form, the mandrel head tapers outwardly and is longitudinally movable within the die to permit varying the wall thickness of a tubular extrusion and, in certain instances, to completely stop the flow of extrusion material so as to effect the cutoff of extrusions. The apparatus is also operative to provide extrusions with openings therein and extrusions having raised and recessed portions.

20 Claims, 10 Drawing Figures

INVENTOR.
Jerome H. Lemelson
BY

EXTRUSION DIE APPARATUS

Matter enclosed in heavy brackets [ ] appears in the original patent but forms no part of this reissue specification; matter printed in italics indicates the additions made by reissue.

RELATED APPLICATIONS

[This is a continuation-in-part of copending application Ser. No. 142,405 filed Oct. 2, 1961, now U.S. Pat. No. 3,422,648 which in turn is a continuation-in-part of Ser. No. 691,622 filed Oct. 2, 1957 now U.S. Pat. No. 3,002,615.]

*This is an application for reissue of U.S. Pat. No. 3,587,281 issued June 28, 1971 as a continuation-in-part of Application Ser. No. 142,405 filed Oct. 2, 1961, now U.S. Pat. No. 3,422,648 which in turn was a continuation-in-part of Application Ser. No. 691,622 filed Oct. 2, 1957 which issued as U.S. Pat. No. 3,002,615 and was reissued as U.S. Pat. No. Re. 25,570 on an application dated Oct. 2, 1962, Ser. No. 228,223.*

SUMMARY OF THE INVENTION

This invention relates to an extrusion apparatus and, in particular, to extruder having a die and a mandrel extending through the die which is longitudinally and/or rotationally movable within the die opening to provide extrusions which vary in shape or cross section along their length.

It is known to form tubular extrusions by forcing an extrudate through a die containing a mandrel which is rigidly affixed to and, in some instances, forms part of said die and defines the inside surface of a tubular extrusion formed in the die. When it is desired to vary the wall thickness of the extrusion, the die must necessarily be changed to provide one containing a mandrel having a different clearance with the die opening. Such requirement in set up generally takes a substantial amount of time and effort and results in periods in which the machine is idle. Accordingly, it is a primary object of this invention to provide an extrusion apparatus including an extrusion die which is so constructed as to permit varying the cross-sectional wall thickness of the tubular extrusion utilizing but one die and without the necessity of changing dies or stopping the extrusion process to effect such variation.

Another object is to provide an extrusion apparatus capable of extruding a tubular extrusion or other shape which varies in cross section and wall thickness along its length depending upon the adjustable movement of a mandrel in the die opening.

Another object is to provide an extrusion apparatus having a die and a mandrel disposed in the die and operative whereby the mandrel not only forms the inside surface of a tubular extrusion but is also movable to effect the stoppage of flow of an extrudate through the die so that an extrusion may be severed thereby from the extruder whenever the mandrel is properly longitudinally adjusted during an extrusion cycle.

Another object is to provide an improved extrusion apparatus capable of forming a tubular extrusion having a spirally fluted inside wall shape.

Another object is to provide an extrusion apparatus capable of producing an extrusion having a spirally fluted outside wall shape.

Another object is to provide an extrusion apparatus capable of producing a mesh or grating extrusion having a latticelike structure.

Another object is to provide an extrusion apparatus capable of producing extrusions having structures which may not be fabricated by conventional extrusion apparatus.

Another object is to provide an extrusion apparatus capable of producing tubular extrusions having irregular and predeterminately varying inside surfaces and wall thicknesses.

Although the instant invention is illustrated and described in conjunction with an annular die, it is noted that it may be also applied to other types of extrusion dies such as flat sheet dies and dies operative to form various tubular shapes.

The instant invention is described in conjunction with various thermoplastic polymers such as polyethylene, polypropylene, poly vinyl chloride, polystyrene, and other thermoplastics which are extruded and form either cellular or noncellular shapes although the apparatus with certain modifications thereto, may also be applicable in the extrusion of nonpolymeric materials such as ceramics and metals.

While the drawings illustrate the extrusion of tubular shapes in a horizontal direction, it is to be understood that such shapes may be upwardly or downwardly extruded such as in the formation of so-called blown film extrusions and to the extrusion of parisons and either directly or indirectly to blow-molding equipment aligned with the extrusion die. Accordingly, the illustrated extrusion apparatus may form part of a blow-molding apparatus and may be operated in accordance with the teachings of the specification to provide so-called parison wall thickness control to place material where it is needed and to remove material from portions of the eventual blown molding where it is desired to reduce the wall thickness thereof.

With the above and such other objects in view as may hereafter more fully appear, the invention consists of the novel constructions, combinations and arrangements as will be more fully described and illustrated in the accompanying drawings, but it is to be understood that changes, variations and modifications may be resorted to which fall within the scope of the invention as claimed.

Figure 6:
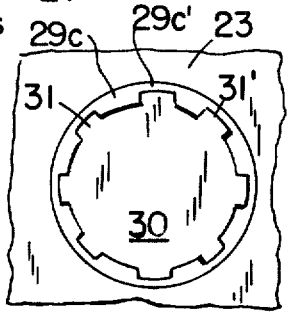
FIG. 6 is an end view of a modified form of the apparatus of FIGS. 3 and 4 wherein the mandrel is provided with a plurality of splines or riblike formations operative to generate channels in the wall of the extrusion when spaced as illustrated in the drawings.
Figure 7:
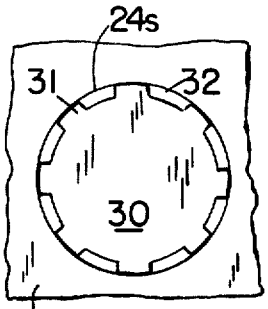
FIG. 7 is an end view of the apparatus of FIG. 6 wherein the mandrel has its rib or land formations engaging the inside surface of the wall of the extrusion die so as to prevent the flow of extrusion material along the portions defined by the ribs and to form a plurality of parallel strip formations thereof.
Figure 8:
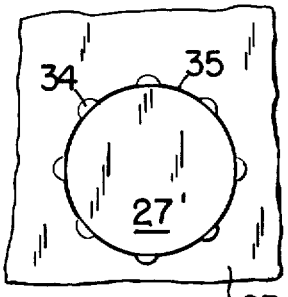
FIG. 8 is an end view of a modified form of the apparatus of FIG. 5 wherein a plurality of channels are provided in the surface of the wall of the extrusion die to form riblike formations per se or on the surface of the tubular extrusion.
Figure 9:
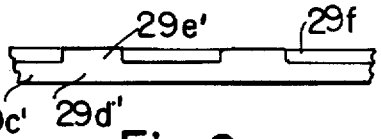
Figure 10:
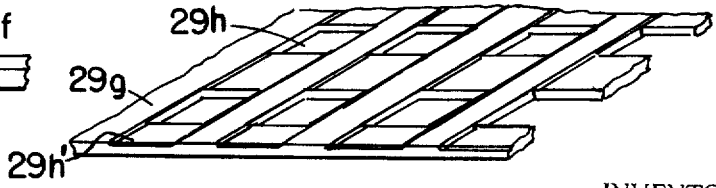
Figure 8:
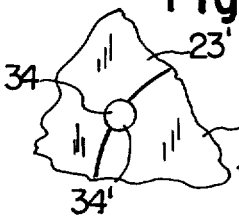
Figure 11:
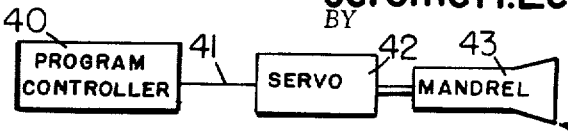

FIG. 8' is a fragmentary view of the end of an extrusion die and mandrel having modified features as disclosed in FIG. 8;

FIG. 9 is an end view of an extrusion formed by means of apparatus of the type shown in FIG. 6;

FIG. 10 is an isometric view of an extrusion formed by means of the apparatus of FIG. 7; and FIG. 11 is a block diagram showing part of a control system for apparatus of the type shown in FIGS. 1 to 8'.

Figure 1:
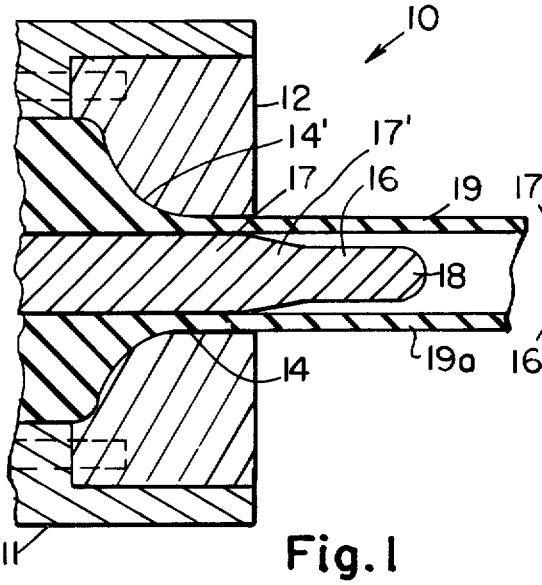
FIG. 1 is a side view in cross section of a portion of an extrusion apparatus having a die and a mandrel extending therethrough which mandrel varies in diameter along its length and is operable to produce extrusions of different wall thickness.
Figure 2:
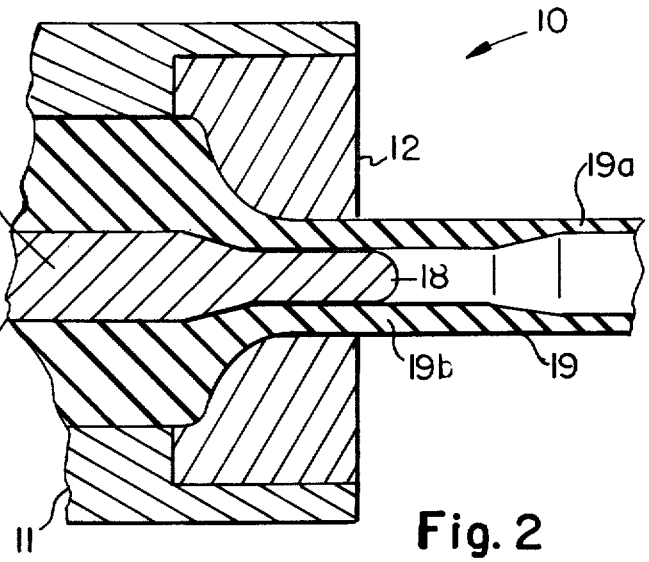
FIG. 2 is a side view in cross section of the apparatus of FIG. 1 showing the mandrel retracted so as to provide an extrusion having an increased wall thickness and a decreased bore.

There is shown in FIGS. 1 and 2 an extrusion apparatus 10 for producing tubular extrusions of different diameters or tubular extrusions which vary in diameter with length. An extrusion chamber 11 is provided having screw or piston means (not shown) for expressing an extrusion material through the throat 14 of a die 12 and over a mandrel 16 disposed in and extending through said throat to define a tubular extrusion 19. The mandrel 16 is provided with a tapered or reduced nose section 18 extending forward of the base portion 17 and is longitudinally movable or adjustable to shift the location of the nose portion with respect to the die throat or opening so as to vary the annular clearance between the outer surface of the die throat thereby varying the annular cross section or wall thickness of the extrusion. In FIG. 1 the base portion 17 of the mandrel is longitudinally positioned in the throat of the die 12 producing an extrusion 19a of a first wall thickness. In FIG. 2, the nose portion 18 of the mandrel 16 is aligned in the throat of the die producing a tubular extrusion 19b having a greater wall thickness and smaller inside diameter than the extrusion or portion 19a produced with the mandrel adjusted as in FIG. 1. By providing a plurality of stepped portions of the mandrel, each smaller in diameter than the portion thereof closer to the base portion 17 and adjusting or driving the mandrel longitudinally to position a selected stepped portion in alignment with the throat 14 of the die, tubes of selected different wall thicknesses may be produced without the need to change dies. If the mandrel is predeterminately longitudinally driven during an extrusion cycle, tubing may be extruded which varies in wall thickness with length. Portions 19b having a greater wall thickness than portions 19a may be provided along those lengths of the extrusion which are to be cut through to define either or both ends of lengths of pipe to facilitate coupling or providing more material to effect threading or flaring of the tube ends. The largest diameter of the mandrel 16 may also be such as to engage the outwardly tapered portion 14 of the throat wall to shut off the flow of extrudate so as to sever the extrusion from the material in the die when the mandrel is so positioned.

If the mandrel is longitudinally shifted during extrusion to provide a plurality of spaced-apart sections 16b of the extrusion for end threading or fitting purposes, a single program controller may be provided as defined in application Ser. No. 142,405 to control the operation of the servomotor moving the mandrel and the servo effecting tube cutoff whereby severance will be effected at predetermined locations of the portions 19b or 19a depending on the dimensional requirements of the finished lengths.

The nose portion [19b] *18* of the mandrel is also subject to other shape variations which, when the mandrel is shifted longitudinally or oscillated in the die throat will effect not only a smooth transition from one diameter to another but also tapering of the wall and the provision of irregular formations therein to affect boundary layer flow of fluid through the pipe.

Figure 3:
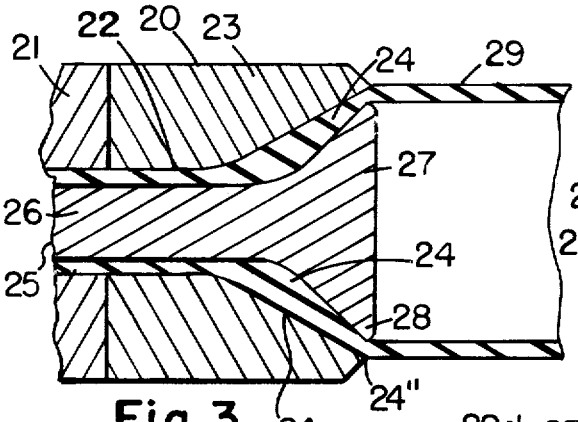
FIG. 3 is a side view in cross section of an extrusion apparatus having a longitudinally movable mandrel with a frustoconical head for producing tubular extrusions.
Figure 4:
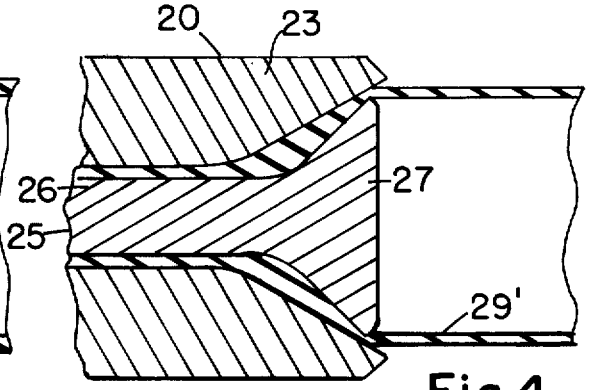
FIG. 4 is a side view in cross section of the apparatus of FIG. 3 in which the mandrel is retracted into the die a degree so as to reduce the wall thickness of the tubular extrusion.

In FIGS. 3 and 4 is shown a modified form of mandrel-die shape designed to provide variations in shape and diameter of extruded tubing. The extrusion apparatus 20 comprises an extrusion chamber 21 having a die 23 connected to one end thereof, the die having an outwardly tapering frustoconical opening or bore 24 communicating with the bore 22 of the chamber. A mandrel 25 is longitudinally movable in the bore of the die and chamber, the base 26 of the mandrel being connected at one end to a lineal actuator or servo (not shown) of the type disclosed in application Ser. No. 142,405 for longitudinally shifting the location of the mandrel. A frustoconical outwardly tapering head portion 27 of the mandrel extends from the cylindrical base portion 26 and projects into the frustoconical bore 24 in the die 23. The end of the tapered mandrel head is defined by a lip or rim 28 of greater diameter than any other portion of the mandrel. The annular clearance 24'' between the greatest diameter portion or lip 28 near the end of the mandrel head 27 will determine the thickness of the wall of the tube being extruded. Close spacing or clearance as in FIG. 4 will produce a tubular extrusion 29 of thinner walls than more separated spacing of the mandrel and die as in FIG. 4.

If the mandrel 25 is driven as far to the left, into the die opening as it will go so that the lip 28 engages the surface 24S of the die bore 24C, extrusion material will not flow and the tubular extrusion 29 may be effectively cut off or cut to length. The mandrel may thus be program controlled in such a close-off movement to periodically sever extruded portions of tubing such as parisons used in blow molding or pipe lengths without the need to use a saw or blade. Frequent, short oscillations of the mandrel may be used to provide a ripple or roughening effect inside an extrusion used as a fluid-carrying pipe to beneficially affect fluid flow or generate predetermined turbulence in the fluid flowing in the pipe.

Figure 5:
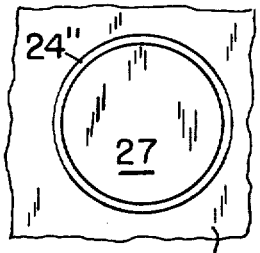
FIG. 5 is an end view of the apparatus of FIGS. 3 and 4 showing the face of the die and the mandrel disposed to provide a thin walled tubular extrusion.

While the mandrel head (*movable die member*) 27 may comprise a smooth conical surface with the lip 28 thereof substantially circular to provide a smooth walled tubular extrusion as shown in FIG. 5, in FIG. 6 the end portion 30 of the frustoconical head 27 is shaped with a series of splines or lands 31 extending to the bead or rim, the lands 31 having outer surfaces 31' which are conical in shape and are adapted to seal against the outer portion of the wall 24S of the conical bore in the die when the tapered mandrel head is moved its full degree to the left or into the die. The condition is illustrated in FIG. 7 whereby extrusion material may only flow through the volumes 32 defined between the groove portions 31 of the mandrel definig a series of a striplike extrusion elements. FIG. 8 shows the die bore modified with spaced-apart longitudinal grooves 34 formed near the end of the conical bore in the wall thereof with the land portion 35 therebetween adapted to be engaged by the conical surface of the mandrel head 27' or land portions thereto to effect changes in the shape of the extrusion of the types described. If the mandrel is moved outwardly from the die as in FIG. 6 so that the clearance volume 29C at the end of the mandrel extends completely around the mandrel and includes spacings 29C' between the outer surfaces of the lands 31 and the inside surface of the die bore, a tubular extrusion may be formed rather than the plural parallel strips formed in FIG. 7.

Utilizing an apparatus of the type shown in FIGS. 3, 4, 6, 7, and 8 or modifications thereof as provided hereafter, a number of different extrusion products may be produced depending on the manner in which the mandrel is adjusted or manipulated, viz:

a. If the mandrel is longitudinally oscillated periodically during extrusion to engage and disengage the land portions with the facing surfaces, a tubular extrusion may be produced with longitudinal and lateral striplike formations joined as in a matrix or net, as shown in FIG. 10.

b. If the mandrel is oscillated a degree whereby the land portions come closer to but never engage the facing conical surface or surfaces, a tubular extrusion may be provided with portions of its walls reinforced by striplike sections of greater thickness extending from either or both the inside and outside surfaces of the tube, as shown in FIG. 9.

c. In another form of operation, the mandrel may be rotated while the land and facing surfaces engage each other and/or are apart so as to provide a tubular extrusion with a plurality of spiral formations or ribs in its inside and/or outside wall or a tube made of helical striplike formations per se joined by other formations provided when the land formations are separated from their mating surfaces.

Thus, the apparatus shown in FIGS. 6–8 may be operated to produce either a net or latticelike wall structure as shown in FIG. 10 by intermittently longitudinally moving the mandrel to bring spaced-apart portions of its outer surface into engagement with portions of the surface of the die bore so as to provide a plurality of longitudinally extending striplike formations 29g, such surface engaging adjustment being interposed by movements of the mandrel outwardly from the die to disengage said surfaces to permit lateral connecting portions 29h' of the extrusion to form between the longitudinal striplike formations, forming openings 29h in the extrusion.

In FIG. 9, a base 29c' of the extrusion is made up of a solid sheetlike formation 29d' having rib formations 29e' extending longitudinally therealong which may or may not be joined by lateral riblike formations 29f' depending on whether or not the mandrel is moved longitudinally during the extrusion cycle.

The die arrangement of FIG. 8 may be modified as in FIG. 8' wherein longitudinal grooves or channels 34 in the die wall extend in alignment with longitudinal channels 34' in the wall of the mandrel 27''. In FIG. 8', the outer surface of the mandrel 27'' is shown in engagement with the inside surface of the bore of the extrusion die 23' thereby producing a plurality of parallel strip or filamentlike formations of extrudate material flowing through the plurality of bores defined by the channels 34 and 34'. If the mandrel 27'' is longitudinally moved to provide clearance between the major engaging surfaces of the die bore and the mandrel, a sheetlike formation will be formed which is reinforced with riblike formations defined by the channels 34 and 34' in the die and mandrel. Accordingly, by oscillating the mandrel 27'' to engage and disengage the surface of the bore of the extrusion die, lateral formations may be formed across the extrusion which join the parallel rib or filament formations formed in the channels 34 and 34' so as to provide a netlike structure of normal design. It is noted that the mandrel 27'' may also be rotated while substantially in engagement with the wall of the die 23' as illustrated in FIG. 8' or while separated therefrom or while the mandrel is oscillated into and out of engagement with the surface of the bore of the die to provide various respective netlike structures or rib reinforced sheet or tubular structures of the types shown in FIGS. 9 and 10 but modified in cross section in accordance with the shapes of the surfaces of the die and mandrel.

A modified form of the apparatus of FIGS. 8 and 8' may also comprise providing the die bore smooth as in FIG. 5 and providing the mandrel with a plurality of parallel channel formations 34 therein. Accordingly, such a die-mandrel design may be utilized to extrude a tube or pipe having a smooth outer surface and having an inside surface containing a plurality of parallel ribs operative to affect the flow of fluid therethrough. If the mandrel 27'' is rotated during extrusion, a plurality of spiral, riblike formations will be formed on the inside surface of the tube or pipe which may be used to cause turbulence in the fluid flowing through the pipe or the mixing of two or more fluent material flowing through the pipe.

As a further modification to the apparatus illustrated in FIGS. 6–8', it is noted that the parallel channellike formation is provided in either the surface of the die bore or the mandrel and may also communicate with respective passageways extending through the die or mandrel and each fed with an extrusion material of a different color or different physical characteristic than the extrusion material formed between the main portions of the mandrel and die so as to color the riblike formations differently than the main extrusion or to provide said formations of a different material such as a polymer of greater strength or rigidity than the polymer flowing through the extrusion chamber for reinforcing the extrusion with a plurality of filament or striplike formations integrally extruded along the length thereof.

Predetermined and properly timed longitudinal movement of the madrels of the apparatus of FIGS. 1 to 8' to effect predetermined changes in the diameter or cross-sectional shape of a tubular extrusion along predetermined portions of the length of the extrusion may be effected by coupling a servo device such as an electrical, hydraulic or pneumatic motor or actuator to the mandrel which is supported in bearing by the extrusion die and/or portions of the extrusion chamber wall. The operation of such servo device may be varied during an extrusion cycle by a conventional timing device or a program controller in accordance, for example, with the teachings of application Ser. No. 142,405 wherein is shown in FIG. 1 details of a longitudinally movable mandrel and die arrangement to vary cross section and in FIGS. 5–6 are shown details of a program controllable apparatus for variably controlling mandrel movement during extrusion. The described rotation of the mandrel to generate spiral grooves or lands within a tubular extrusion may be effected by directly or indirectly coupling an electrically or fluidically operated motor to the mandrel to rotate same in a bearing support which is provided either in the extrusion die and/or the extrusion chamber. Such rotation may be effected either at constant speed during the entire extrusion cycle to provide helical formations within the tube of constant pitch along the length thereof or during selected portions of the extrusion cycle to provide helical formations during selected times during extrusion and parallel formations during others in accordance with product requirements. Similarly, the speed of the mandrel-rotating means may be varied to vary the pitch of the spiral formations in the wall of the tubular extrusion along selected portions of the length of the extrusion or from one extrusion cycle to the next depending on varying product requirements.

Apparatus of the type described may also have the mandrel rotating and longitudinally moving means controlled in its operation by a single master controller to vary mandrel rotation and longitudinal location during an extrusion cycle for varying tube diameter and fluting during an extrusion cycle or from one cycle to the next without the need for changing dies or setup. By utilizing apparatus of the types illustrated in FIGS. 6 to 8' and variable controlling either or both mandrel longitudinal movement and rotation during an extrusion cycle, netting, mesh or gridlike extrusions may be produced in which the mesh shape and interstices may be varied with length. Furthermore, a tubular mesh or grid may be produced using any of the die arrangements of FIGS. 6, 7, 8 and 8', whereby portions of the extrusion are defined by a gridlike structure and other portions joining same may be produced which have no openings therein.

The *relatively* movable die arrangements of FIGS. 5 to 8' may also be other than circular in shape as shown and may even comprise sheeting dies made in two parts either or both of which *die members* are adapted to oscillate laterally while in engagement with or spaced apart from the other to produce sheetlike extrusions of netting or irregularly fluted surface shape or substantially uniform or variable configuration.

FIG. 11 illustrates a simple control diagram showing one mode of control of the extrusion apparatus of FIGS. 1 to 8' wherein one output 41 of a program controller 40 is connected to variably provide electrical energy to a servomotor 42 such as the described mandrel rotating and/or oscillating motor for either moving said mandrel between two longitudinal locations in the extrusion die to vary the shape and/or wall thickness of the extrusion or for rotating said mandrel at a speed determined by the adjustment or presetting of the program controller 40. The program controller 40 may comprise, in its simplest form, a predetermining counter or timer to a multioutput circuit programmer generating signals used directly or indirectly to control one or more motors of the extrusion apparatus by reproducing said signals from a recording member such as a record card, tape, disc, or other means. Thus the program controller 40 may either supply electrical energy directly to the servo 42 for operating same in a manner whereby the servomotor is stopped when no power is supplied by the controller or said controller may provide a plurality of control signals which are applied to the control means for the servomotor or motors to be controlled thereby to either start and stop operation of said servos or to variably operate same during an extrusion cycle. The mandrel 43 of FIG. 11 is thus representative of any of the mandrels shown in FIGS. 1 to 8' while the servo 42 may be operative to either rotate or longitudinally position the mandrel in accordance with the command control signal generated on the output of the program controller. The single program controller 40 may also have respective control outputs thereof connected to two servos, one operative to rotate the mandrel and the other to oscillate or longitudinally position the mandrel in the extrusion die to permit predetermined variations in the wall thickness of the extrusion along its length, to generate interstices therein which are interposed between solid sections as shown in FIGS. 9 and 10 or to vary the shape or pitch of the latticelike structure formed between the die and mandrel. The program controller 40 may also be replaced by a hand-adjusted control signal varying device such as a variable resistor for varying the location of the mandrel 43 in the extrusion die or rotational speed of the mandrel prior to each extrusion cycle without the need to manually adjust the mandrel in the die or change dies.

I claim:

[1. A variable extrusion apparatus comprising in combination:

a. an extruder having a die for forming an extrusion material to a tubular shape and means for forcing said extrusion material through an opening in said die, b. a mandrel extending through said die opening, c. said mandrel being supported for longitudinal movement of said die opening, d. said mandrel having a head portion connected to a base portion, e. said mandrel and die opening being shaped whereby said head portion of said mandrel may engage a portion of the wall of the die to vary the shape of the annular volume between the die and mandrel, f. means for moving said mandrel in said die opening, and g. means for controlling movement of said mandrel during an extrusion cycle to bring the mandrel into and out of engagement with the wall of the die opening so as to vary the flow of extrusion material through said die.]

[2. An extrusion apparatus in accordance with claim 1, said head portion of said mandrel and said die being shaped so as to permit the flow of some extrusion material between the mandrel and die wall when the two are in engagement and to correspondingly vary the shape of the extrusion.]

[3. An extrusion apparatus in accordance with claim 2 wherein said head portion of said mandrel is shaped with a plurality of separated land portions, the outer surfaces of which land portions are operative to engage corresponding portions of the surface of the die wall to stop the flow of extrusion material therebetween while the voids between adjacent land portions permit the continuous flow of extrusion material between said mandrel and die wall for forming space separated portions of the extrusion.]

[4. An extrusion apparatus in accordance with claim 1 wherein the wall of said die opening against which an extrusion is formed to shape is provided with at least one longitudinal cavity therein defining a passageway through which extrusion material may flow when said mandrel is positioned to engage the die wall.]

[5. An extrusion apparatus in accordance with claim 1 wherein both the outer surface of said mandrel and the surface of said die wall against which extrusion material is formed to shape are provided with respective channels defining at least one passageway between the mandrel and die when the two are in engagement with each other, through which passageway extrusion material may flow.]

[6. An extrusion apparatus in accordance with claim 1, including a program controller for automatically controlling said means for moving said mandrel to cause the mandrel to predeterminately engage and disengage the wall of the die opening.]

[7. An extrusion apparatus in accordance with claim 1, wherein said head portion of said mandrel is of substantially frustoconical shape tapering outwardly from said base portion, said mandrel head portion having a lip formation near its end over which lip formation extrusion material may flow and is formed into a tube, said lip formation being movable into engagement with the die wall, the longitudinal movement of said mandrel being operative to vary the clearance between said lip formation and the surface of the wall of the die opening whereby the wall thickness of the tubular extrusion formed over said mandrel lip formation may be correspondingly varied.]

[8. An extrusion apparatus in accordance with claim 1, wherein said die and mandrel are shaped to produce a tubular extrusion and said mandrel is shaped such that, when it is moved to engage a surface of the wall of the die opening, it will completely stop the flow of extrusion material through said die and terminate the formation of said tubular extrusion from said die.]

[9. A method of forming tubular shapes which vary in cross section along their length comprising:

a. disposing a mandrel in an opening in an extrusion die, the mandrel being shaped to define an annular clearance volume between the wall of the die opening and the surface of the mandrel.

b. shaping the mandrel in the wall of the die opening such that longitudinal movement of the mandrel through the die will vary the width of said annular clearance volume and will effect a variation in the shape of an extrusion formed between the mandrel and the wall of the die opening, c. flowing extrusion material through said annular clearance volume to form a tubular extrusion thereof of a first diameter and wall thickness, and d. relatively moving the mandrel and extrusion die during an extrusion cycle to longitudinally shift the location of the mandrel in the die opening and to cause surface portions of the two to engage and disengage each other so as to vary said annular clearance volume and the shape of the extrusion formed between the two.]

[10. An extrusion apparatus in accordance with claim 1, said means for longitudinally moving said mandrel in said die opening being operative to variably position said mandrel for varying the clearance between the mandrel and the die wall so as to vary the shape of the extrusion during an extrusion cycle.]

*11. A variable extrusion apparatus comprising in combination:*

*a. an extruder having a die forming an extrusion material to a tubular shape and means for forcing said extrusion material through an opening in said die,*

*b. a mandrel extending through said die opening,*

*c. said mandrel being supported for longitudinal movement of said die opening,*

*d. said mandrel having a head portion connected to a base portion,*

*e. said mandrel and die opening being shaped whereby said head portion of said mandrel may engage a portion of the wall of the die to vary the shape of the annular volume between the die and mandrel,*

*f. means for moving said mandrel in said die opening, and*

*g. means for controlling movement of said mandrel during an extrusion cycle to bring the mandrel into and out of engagement with the wall of the die opening so as to vary the flow of extrusion material through said die.*

*12. An extrusion apparatus in accordance with claim 11, said head portion of said mandrel and said die being shaped so as to permit the flow of some extrusion material between the mandrel and die wall when the two are in engagement and to correspondingly vary the shape of the extrusion.*

*13. An extrusion apparatus in accordance with claim 12 wherein said head portion of said mandrel is shaped with a plurality of separated land portions, the outer surfaces of which land portions are operative to engage corresponding portions of the surface of the die wall to stop the flow of extrusion material therebetween while the voids between adjacent land portions permit the continuous flow of extrusion material between said mandrel and die wall for forming space-separated portions of the extrusion.*

*14. An extrusion apparatus in accordance with claim 11 wherein the wall of said die opening against which an extrusion is formed to shape is provided with at least one longitudinal cavity therein defining a passageway through which extrusion material may flow when said mandrel is positioned to engage the die wall.*

*15. An extrusion apparatus in accordance with claim 11 wherein both the outer surface of said mandrel and the surface of said die wall against which extrusion material is formed to shape are provided with respective channels defining at least one passageway between the mandrel and die when the two are in engagement with each other, through which passageway extrusion material may flow.*

*16. An extrusion apparatus in accordance with claim 11, including a program controller for automatically controlling said means for moving said mandrel to cause the mandrel to predeterminately engage and disengage the wall of the die opening.*

*17. An extrusion apparatus in accordance with claim 11, wherein said head portion of said mandrel is of substantially frustoconical shape tapering outwardly from said base portion, said mandrel head portion having a lip formation near its end over which lip formation extrusion material may flow and is formed into a tube, said lip formation being movable into engagement with the die wall, the longitudinal movement of said mandrel being operative to vary the clearance between said lip formation and the surface of the wall of the die opening whereby the wall thickness of the tubular extrusion formed over said mandrel lip formation may be correspondingly varied.*

*18. An extrusion apparatus in accordance with claim 11, wherein said die and mandrel are shaped to produce a tubular extrusion and said mandrel is shaped such that, when it is moved to engage a surface of the wall of the die opening, it will completely stop the flow of extrusion ma-* terial through said die and terminate the formation of said tubular extrusion from said die.

19. A method of forming tubular shapes which vary in cross section along their length comprising:

a. disposing a mandrel in an opening in an extrusion die, the mandrel being shaped to define an annular clearnace volume between the wall of the die opening and the surface of the mandrel, b. shaping the mandrel in the wall of the die opening such that longitudinal movement of the mandrel through the die will vary the width of said annular clearance volume and will effect a variation in the shape of an extrusion formed between the mandrel and the wall of the die opening, c. flowing extrusion material through said annular clearance volume to form a tubular extrusion thereof of a first diameter and wall thickness, and d. relatively moving the mandrel and extrusion die during an extrusion cycle to longitudinally shift the location of the mandrel in the die opening and to cause surface portions of the two to engage and disengage each other so as to vary said annular clearnace volume and the shape of the extrusion formed between the two.

20. An extrusion apparatus in accordance with claim 11, said means for longitudinally moving said mandrel in said die opening being operative to variably position said mandrel for varying the clearance between the mandrel and the die wall so as to vary the shape of the extrusion during an extrusion cycle.

21. An extrusion method for manufacturing articles having at least in part a net-like structure comprising:

a. disposing a die member relative to an opening in an extrusion die, b. shaping the die member relative to the opening in the die such that movement of the die member relative to the opening in the die will effect a variation in configuration of an extrusion formed between the die member and the opening in the die, c. flowing extrusion material through the opening in the die to form an extrusion of a first configuration, d. relatively moving the die member and extrusion die during an extrusion cycle to shift the location of the die member so as to vary the opening in the die and the configuration of the extrusion formed in the opening in the die to produce an article having at least in part a net-like structure, e. generating an electrical signal, and f. converting said electrical signal into relative mechanical movement of said die member and die to control the extrusion of the net-like structure.

22. An extrusion method for manufacturing articles having at least in part a net-like structure comprising:

a. disposing a die member across an opening in an extrusion die, the die member being shaped to define a clearance volume between a surface of the die member and the opening in the die, b. shaping the die member relative to the opening in the die such that movement of the die member relative to the opening in the die will vary said clearance volume and will effect a variation in the configuration of an extrusion formed between said surface of the die member and opening in the die, c. flowing extrusion material through said clearance volume to form an extrusion thereof of a first configuration, d. relatively moving the die member and extrusion die during an extrusion cycle to shift the location of the die member and cause selected portions of the die and said surface of the die member to engage and disengage each other so as to vary said clearance volume and the configuration of the extrusion formed between the two to produce an article having at least in part a net-like structure.

23. An extrusion method for manufacturing articles having at least in part a net-like structure comprising:

a. disposing member in juxtaposition to an opening in an extrusion die, the die member being shaped to define a clearance volume between a surface of the die member and the opening in the die, b. shaping the die member relative to the opening in the die such that movement of the die member relative to the opening in the die will vary said clearance volume and will effect a variation in the configuration of an extrusion formed between said surface of the die member and opening in the die, c. flowing extrusion material through said clearance volume to form an extrusion thereof of a first configuration, and d. relatively moving the die member and extrusion die during an extrusion cycle to shift the location of the die member and cause said surface of the die member and wall of the die to engage and disengage each other adjacent said opening so as to vary said clearance volume and the configuration of the extrusion formed between the two to produce an article having at least in part a net-like structure.

24. An extrusion method for manufacturing a net-like structure comprising a first set of spaced strands and a second set of spaced strands that overlap the first set of strands at an angle thereto comprising:

a. disposing a die member in juxtaposition to a grooved opening in an extrusion die, the die member being shaped to define a clearance volume between a surface of the die member and the grooved opening in the die, b. shaping the die member relative to the grooved opening in the die such that movement of the die member relative to the grooved opening in the die will vary said clearance volume and will effect a variation in the configuration of an extrusion formed between said surface of the die member and grooved opening in the die, c. continuously flowing extrusion material through said clearance volume;

d. relatively moving the die member and extrusion die during an extrusion cycle to shift the location of the die member and periodically cause selected portions of the die and the said surface of the die member to engage each other and extrude a first set of spaced strands through the grooves in said die opening and to disengage each other and continuously extrude said first set of strands through said grooves while extruding spaced strands through said clearance volume to form the second set of strands which overlap the first set of strands at an angle thereto to form the net-like structure.

25. A method of making an integral plastic net-like structure with an extrusion die having a die member which is moved relative to the die to engage and disengage a surface of the die member with a surface of the die adjacent an extrusion orifice therein one of the said engaging surfaces having grooves positioned therein comprising the steps of:

a. extruding flowable plastic simultaneously through a plurality of said grooves to produce a plurality of parallel strands of said plastic when said surfaces are engaged, b. periodically moving said die member relative to the die to disengage said surfaces and interconnect all of said grooves in open communication with said extrusion orifice and form an open communication between all of said grooves and said extrusion orifice, and c. simultaneously extruding plastic through said grooves and through said extrusion orifice to continue to produce said parallel strands and to produce a continuous plastic member interconnecting said strands.

26. A variable extrusion apparatus comprising in combination:

a. an extruder having a die for forming an extrusion material to a shape and means for forcing said extrusion material through an opening in said die, b. a movable die member extendable across said die opening, c. said movable die member being supported for movement relative to said die opening, d. said movable die member and die opening being shaped whereby said movable die member may engage a portion of the wall of the die to vary the shape of the volume between the die and the movable die member, e. means for moving said movable die member and said die opening with respect to each other, and f. means for controlling the relative movement of the movable die member and the die during an extrusion cycle to bring the movable die member and the wall of the die opening into and out of engagement with each other so as to vary the flow of extrusion material through said die.

27. An extrusion apparatus in accordance with claim 26 including a program controller for automatically controlling said means for moving said movable die member and said die to predeterminately engage and disengage each other.

28. Apparatus for extrusion of plastic articles having at least in part a net-like structure which comprises:

a. an extruder having a die with an opening therein for extruding flowable plastic material, b. means for forcing said plastic material through the opening in the die, c. a die member movable relative to said opening for effecting a variation in the configuration of an extrusion formed between the die member and opening in the die, d. means for relatively moving said die member and extrusion die to shift the location of the die member relative to the opening and vary the configuration of the extrusion to produce an article having at least in part a net-like structure, e. means for generating an electrical signal, and f. said means for relatively moving said die member and extrusion die being adapted to receive and convert the said electrical signal into relative mechanical movement of said die member and die to control the extrusion of the net-like structure.

29. A variable extrusion apparatus comprising in combination:

a. an extruder having a die for forming an extrusion material to a tubular shape and means for forcing said extrusion material through an opening in said die, b. a mandrel extending through said die opening, c. said mandrel being supported for longitudinal movement of said die opening, d. said mandrel having a head portion connected to a base portion, e. said mandrel and die opening being shaped whereby said head portion of said mandrel may engage a portion of the wall of the die to vary the shape of the annular volume between the die and mandrel, f. means for moving said mandrel in said die opening, g. means for controlling movement of said mandrel during an extrusion cycle to bring the mandrel into and out of engagement with the wall of the die opening so as to vary the flow of extrusion material through said die, and h. said means for controlling the movement of said mandrel comprising:

(i) means for generating an electrical signal, and (ii) means for converting the electrical signal into mechanical movement of the mandrel.

30. A method of forming tubular shapes which vary in cross section along their length comprising:

a. disposing a mandrel in an opening in an extrusion die, the mandrel being shaped to define an annular clearance volume between the wall of the die opening and the surface of the mandrel, b. shaping the mandrel in the wall of the die opening such that longitudinal movement of the mandrel through the die will vary the width of said annular clearance volume and will effect a variation in the shape of an extrusion formed between the mandrel and the wall of the die opening, c. flowing extrusion material through said annular clearance volume to form a tubular extrusion thereof of a first diameter and wall thickness, d. relatively moving the mandrel and extrusion die during an extrusion cycle to longitudinally shift the location of the mandrel in the die opening and to cause surface portions of the two to engage and disengage each other so as to vary said annular clearance volume and the shape of the extrusion formed between the two, and e. controlling the relative movement of the mandrel and the extrusion die by:

i. generating an electrical signal, and ii. converting said electrical signal into relative mechanical movement of the mandrel and the extrusion die.

* * * * *

UNITED STATES PATENT OFFICE

CERTIFICATE OF CORRECTION

Patent No. RE. No. 28,600 Dated November 4, 1975

Inventor(s) Jerome H. Lemelson

It is certified that error appears in the above-identified patent and that said Letters Patent are hereby corrected as shown below:

Claim 11, line 3, after "die" insert -- for --. Under (63) first page: Serial No. 691,622, Oct. 2, 1957" should read -- Serial No. 691,622, October 22, 1957 --. Column 1, line 20, "Oct. 2, 1957" should read -- Oct. 22, 1957 --. Column 11, lines 7 and 22, "clearnace" should read -- clearance --. Column 12, line 9, "disposing member" should read -- disposing a die member --. Column 14, line 55, "i." should read -- (i.) --. Column 14, line 56, "ii." should read -- (ii.) --.

Signed and Sealed this thirtieth Day of March 1976

[SEAL]

Attest:

RUTH C. MASON
*Attesting Officer*

C. MARSHALL DANN
*Commissioner of Patents and Trademarks*

UNITED STATES PATENT OFFICE

CERTIFICATE OF CORRECTION

PATENT NO. : RE. No. 28,600

DATED : November 4, 1975

INVENTOR(S) : Jerome H. Lemelson

It is certified that error appears in the above-identified patent and that said Letters Patent are hereby corrected as shown below:

Cancel claims 11-21. Remove the brackets from each of claims 1-10. Under [63] first page: "Serial No. 691,622, Oct. 2, 1957" should read --Serial No. 691,622, October 22, 1957--. Column 1, line 20, "Oct. 2, 1957" should read --Oct. 22, 1957--. Column 11, lines 7 and 22, "clearnace" should read --clearance--. Column 12, line 9, "disposing member" should read --disposing a die member--. Column 14, line 55, "i." should read --(i.)--. Column 14, line 56, "ii." should read --(ii.)--.

This certificate supersedes Certificate of Correction issued March 30, 1976.

Signed and Sealed this

Thirteenth Day of July 1976

[SEAL]

*Attest:*

RUTH C. MASON
*Attesting Officer*

C. MARSHALL DANN
*Commissioner of Patents and Trademarks*